United States Patent [19]

Rossi et al.

[11] Patent Number: 5,479,057
[45] Date of Patent: Dec. 26, 1995

[54] ROTOR/STATOR VOLTAGE MODULATION DEVICE, IN PARTICULAR FOR A BRUSHLESS ELECTRIC MOTOR

[75] Inventors: Rinaldo Rossi, Paris; Jean-Yves Guerrero, Plaisir, both of France

[73] Assignee: Aerospatiale Societe Nationale Industrielle, France

[21] Appl. No.: 170,298

[22] PCT Filed: Apr. 21, 1993

[86] PCT No.: PCT/FR93/00391

§ 371 Date: Dec. 21, 1993

§ 102(e) Date: Dec. 21, 1993

[87] PCT Pub. No.: WO93/22621

PCT Pub. Date: Nov. 11, 1993

[30] Foreign Application Priority Data

Apr. 24, 1992 [FR] France ................... 92 05102

[51] Int. Cl.$^6$ ..................... H02K 11/00; H02K 13/00
[52] U.S. Cl. ............................. 310/72; 310/68 B
[58] Field of Search ..................... 310/68 B, 72, 310/143, 232, 233; 340/870.38, 671, 672; 324/163, 176; 307/122; 33/1 PT; 363/32, 102, 103; 318/254, 138, 439

[56] References Cited

U.S. PATENT DOCUMENTS

| | | | |
|---|---|---|---|
| 2,151,793 | 3/1939 | Patin | 340/870.38 |
| 2,538,415 | 1/1951 | Ergen | 340/870.38 |
| 3,116,431 | 12/1963 | Baudot | 310/72 |
| 4,631,540 | 12/1986 | Feldman | 340/870.38 |
| 4,933,585 | 6/1990 | Rossi | 310/49 R |
| 5,281,880 | 1/1994 | Sakai | 310/232 |

FOREIGN PATENT DOCUMENTS

| | | |
|---|---|---|
| 0211477 | 5/1986 | European Pat. Off. . |
| 2654238 | 1/1978 | Germany . |
| WO9109408 | 6/1991 | WIPO . |

OTHER PUBLICATIONS

Patent Abstracts of Japan, Fujitsu Ltd., Oct. 7, 1982 vol. P p. 187.

Primary Examiner—Steven L. Stephan
Assistant Examiner—Clayton E. LaBalle
Attorney, Agent, or Firm—Remy J. VanOphem; John VanOphem

[57] ABSTRACT

A current modulation device embodying a fixed stator which has at least one annular signal track with an axis and whose potential varies circumferentially on a periodic basis as well as a plurality of collector tracks which are connected to a respective output terminal; and a rotor adapted to be coupled to a rotary driving body rotating about the axis which has output brushes of equal number as the collector tracks and each adapted to sweep one respective collector track, as well as input brushes of equal number as the output brushes, each input brush being electrically connected to a respective output brush and being adapted to sweep the annular signal track, the input brushes being so arranged as to take, during the rotation of the rotor with respect to the stator, potentials presenting a given electric phase-shift.

15 Claims, 7 Drawing Sheets

ROTOR/STATOR VOLTAGE MODULATION DEVICE, IN PARTICULAR FOR A BRUSHLESS ELECTRIC MOTOR

BACKGROUND OF THE INVENTION

The invention concerns the modulation of the current in the phases of a brushless motor, and more generally the modulation of at least two currents as a function of the rotation of a rotor with respect to the stator.

Generally, the switching of the current within the phases of a brushless motor is controlled either by Hall-effect sensors which provide logic signals (on/off) which are directly used for switching the phases, or by a resolver or absolute optical coder providing the relative position of the rotor of the motor with respect to its stator. This solution, which is far more precise, is well suited to motors with a sinusoidal wave shape. It is, however, much more expensive and bulky.

SUMMARY OF THE INVENTION

The aim of the invention is to obtain continuous and precise information on the relative positions of the rotor and stator of a brushless motor, with a view to generating alternating signals intended to control the supply of the phases of the motor, by means of a device which is compact and inexpensive and which, in addition, makes it possible, by processing the signals obtained, to have good quality tachometric information on the rotation speed of the motor.

More generally, an objective of the present invention is to obtain continuous and precise information on the position or relative speed of a rotor with respect to a stator by means of a voltage modulation device which is compact and inexpensive.

For this purpose, the present invention proposes a voltage modulation device embodying:

a fixed stator having at least one annular signal track with an axis, connected at points angularly distributed in alternation with the positive and negative terminals of a DC voltage source and having a resistivity such that its potential varies circumferentially in a periodic fashion between a maximum and minimum value, as well as a plurality of collector tracks centered on the axis and each connected to a respective output terminal; and a rotor centered on the axis, adapted to be coupled with a rotary drive body rotating about the axis, having a plurality of at least two output brushes, of which there are the same number as the plurality of collector tracks, such that each output brush is adapted to sweep a respective collector track. The rotor also includes a plurality of input brushes, equal in number to the number of output brushes, each input brush being electrically connected to a respective output brush, each input brush being adapted to sweep such an annular signal track with a periodic circumferential variation of potential carried by the stator. The input brushes are disposed so as to take off, during the rotation of the rotor with respect to the stator, potentials with a given electrical phase difference.

It will be appreciated that such a device is a continuous-rotation potentiometer with multiple brushes (i.e. with multiple parallel outputs).

The potentiometer delivers, in parallel, P items of periodic information in the course of the rotation of the rotary drive body, P being equal to the number of output brushes. When this potentiometer is used to control a multiphase brushless motor, having its rotor coupled to that of the motor, the number P is in principle equal to the number of phases of the motor (or to a multiple of this number) and its output terminals are each used to control the current of one of the phases of the motor by means of power electronics of any known appropriate type. If n is the number of pairs of poles in the motor, the above-mentioned periodic data have a frequency which is preferably equal to n (even to a submultiple of n) times the frequency of rotation of the motor. By appropriate electronic shaping processing of the signals applied by the output brushes to the collector tracks, the shape of the periodic data coming from the potentiometer (zig-zag shape, sinusoidal or trapezoidal shape in particular) can be adapted in accordance with the destination of the periodic data (control of the motor, measurements of speed, control systems, etc.).

Because of its simplicity, the device of the invention is compact and lightweight.

The formation of the signal or collector tracks uses proven and robust technologies known to the manufacturers of potentiometers, leading to a high level of reliability in use; they are, for example, tracks known as "plastic tracks" made of conductive synthetic materials whose stability range and operating range in terms of temperature (typically $-55°$ C., $200°$ C.) make possible a very large number of applications.

According to other advantages of the invention:

the device is precise and insensitive to variations in temperature, unlike Hall-effect or optical devices;

the device is insensitive to magnetic perturbation caused by the motor, unlike Hall-effect devices;

the processing of the signals delivered makes it possible to easily obtain good quality tachometric information, which is very useful for speed regulation or for control functions; and the price of the sensor is low given its precision.

According to preferred arrangements of the invention, which may advantageously be combined:

the stator has a single annular signal track swept by each input brush, the input brushes being offset angularly;

the collector tracks are two in number and the input brushes have an angular difference equal to $(i+¼)$. $\phi$, where i is an integer, if $\phi$ is the angular period with which the potential of the signal track varies circumferentially;

the collector tracks are three in number, and the input brushes have angular differences of $(i+⅓)$. $\phi$, and $(i+⅔)$. $\phi$, where i is an integer, if $\phi$ is the angular period with which the potential of the signal track varies circumferentially;

the signal track is connected at four points at $90°$ to each other, in alternation, either to the positive terminal or to the negative terminal of the DC voltage source, by virtue of which the angular period with which the potential of the signal track varies circumferentially is $\pi$;

the signal and collector tracks and the input and output brushes are located on the faces which are at right angles to the axis;

the input brushes on the one hand and the output brushes on the other hand, are located on different faces of the rotor, and the signal track on the one hand, and the collector tracks on the other hand, are located on different faces of the stator;

all the brushes are located on the same face of the rotor, and all the tracks are located on the same face of the stator;

the signal and collector tracks and the input and output brushes are located on cylindrical surfaces of the stator and rotor, respectively;

a signal-shaping component is connected between the collector tracks and the output terminals;

the rotary drive body is the rotor of a brushless electric motor, each of the phases of which is controlled by the signal supplied respectively by one of the output terminals;

the rotor of the device according to the invention has a hollow sleeve coupled, with respect to rotation, to the shaft of the motor; and the resistivity of the collector tracks is lower than the resistivity of the signal track by at least two orders of magnitude.

Other objects, characteristics and advantages of the invention will become clear from the following description, given by way of non-limiting example, with reference to the accompanying drawings appended hereto.

DETAILED DESCRIPTION OF THE PREFERRED EMBODIMENT

Figure 1:
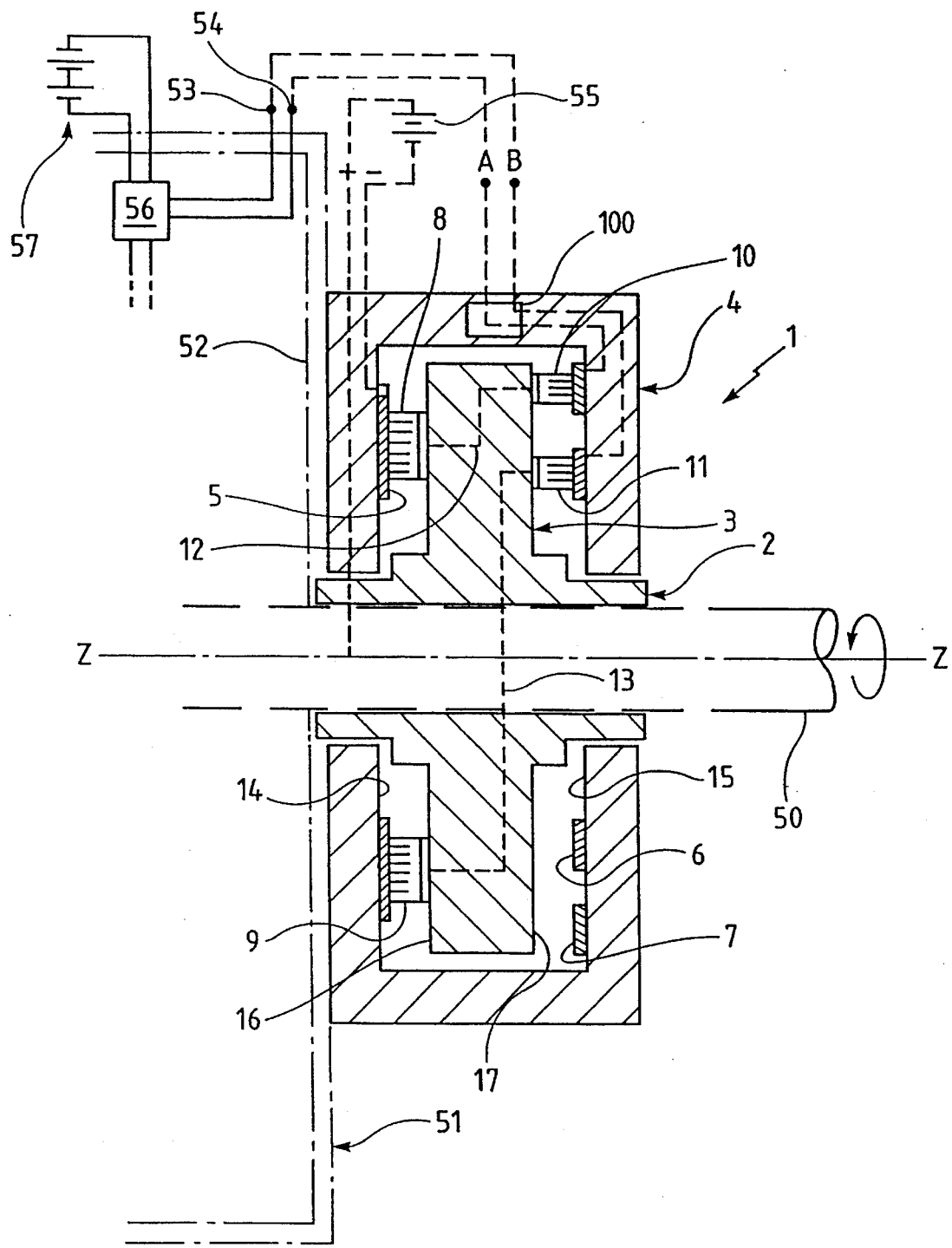
FIG. 1 is a view in axial section of a voltage modulation device in accordance with the invention, along the line I—I in FIG. 5.

FIGS. 1 to 5 show a voltage modulation device serving to control the phases of a brushless motor, designated overall by the reference numeral 1.

The device has a hollow sleeve 2, coupled with respect to rotation, for example by keying, to a control shaft 50, a rotor 3 integral with the sleeve 2 and a fixed stator 4, negative and positive supply terminals, and output terminals A and B.

More precisely, the shaft 50 driving the sleeve 2 and therefore the rotor 3 in rotation is in this case the output shaft of a two-phase rotary motor 51 having a casing 52 to which the stator 4 is fixed by any appropriate known means, while the output terminals A and B of the device are connected to the switching control terminals 53 and 54 of the two-phase motor.

The positive and negative supply terminals of the voltage modulation device 1 are connected to the terminals of a stabilized source of DC current 55 of any appropriate known type (for example a −10 V, +10 V source).

In a conventional manner, the switching control (or command) terminals 53 and 54 are connected to a power electronic unit shown diagrammatically at 56 (of any appropriate known type) adapted, in accordance with the command signals, to apply current supplied by a voltage source 57 (in this case DC) to the phases (not shown) of the motor in an appropriate manner.

The stator 4 has on the one hand an annular signal track 5 (in this example there is only one), and on the other hand two annular collector tracks 6 and 7, these different annular tracks being centered on the axis Z—Z of the control shaft 50.

The rotor 3 has two input brushes 8 and 9, both adapted to sweep the annular signal track 5, and two output brushes 10 and 11, connected, respectively, to the two input brushes 8 and 9 inside the rotor 3 by means of connections 12 and 13, and adapted to sweep the two annular collector tracks 6 and 7.

In the example under consideration, the annular signal and collector tracks 5, 6 and 7 are located on transverse faces 14 and 15 of the stator 4, while the input and output brushes 8 through 11 are located on the transverse faces 16 and 17 of the rotor, the input brushes 8 and 9 being situated at the same distance from the axis Z—Z, but offset angularly with respect to each other by an angle $\alpha$ other than zero, while the output brushes 10 and 11 are situated at different distances with respect to the axis Z—Z, with a possible angular offset which is in this case equal to 0.

Placing the tracks and brushes on the transverse faces has the advantage of making it possible to give very small axial dimensions to the device 1.

In an embodiment which is not shown, the tracks and brushes can be disposed on the facing cylindrical surfaces of the stator and rotor respectively, which has the advantage of permitting very small radial dimensions.

The annular signal track is connected at a plurality of first points 20 to the positive power supply terminal and at a plurality of second points 21, of which there are the same number as the first points 20, to the negative power supply terminal. The first points 20 and the second points 21 are positioned in alternation and have a regular angular distribution; the first and second points are two and two in number, and therefore alternate at an angle of 90°. The resistivity of the annular signal track is sufficiently high for the potential of this track to vary circumferentially between the maximum $V_{max}$ and minimum $V_{min}$ values of the potential of the DC current source 55 without any significant dissipation of power. This potential varies linearly as a function of the angle by which there is a movement away from a point 20 towards a point 21 and vice versa, in this case with an angular period of $\pi$.

In a further embodiment which is not shown, there can of course be as many DC sources as there are pairs of first and second points.

The input brushes are disposed so as to take off potentials having, during the rotation of the rotor with respect to the stator, an electric phase difference of π/2. It is because of this that, with respect to the angular period of π, the angular difference α between them is (i+¼) π, i being any integer between 0 and 3. In the example shown is 225° (see FIG. 5).

The annular collector tracks 6 and 7 are also conductive, preferably having considerably lower resistivity (for example in a ratio of 100 to 1000) than that of the annular signal track. They are connected respectively to the output terminals A and B.

As an example, the device 1 has an external diameter of 45 mm and a thickness of 10 mm and the internal diameter of the sleeve is 10 mm. The annular signal track has a diameter of 35 mm, a width of 3 mm, a thickness of 0.3 mm, and a resistance seen from the terminals of the voltage source of about 10 kΩ. These tracks were made by EURO-FARAD using a conventional technology of plastic tracks loaded with conductive particles.

It will be understood that the terminal A connected to annular collector track 7 is at the same potential as the output brush 10, therefore at the same potential as the input brush 8, and therefore at the potential of the part of the annular signal track 5 with which the input brush 8 is in contact at the moment in question. Similarly, the terminal B is, through the annular collector track 6, output brush 11 and input brush 9, at the potential of the part of the annular signal track 5 with which the input brush 9 is in contact at the moment in question.

The annular signal track forms with the input brushes an annular series of potentiometric dividers (equal in number to the number of track sections separated by the points 20 and 21).

Figure 5:
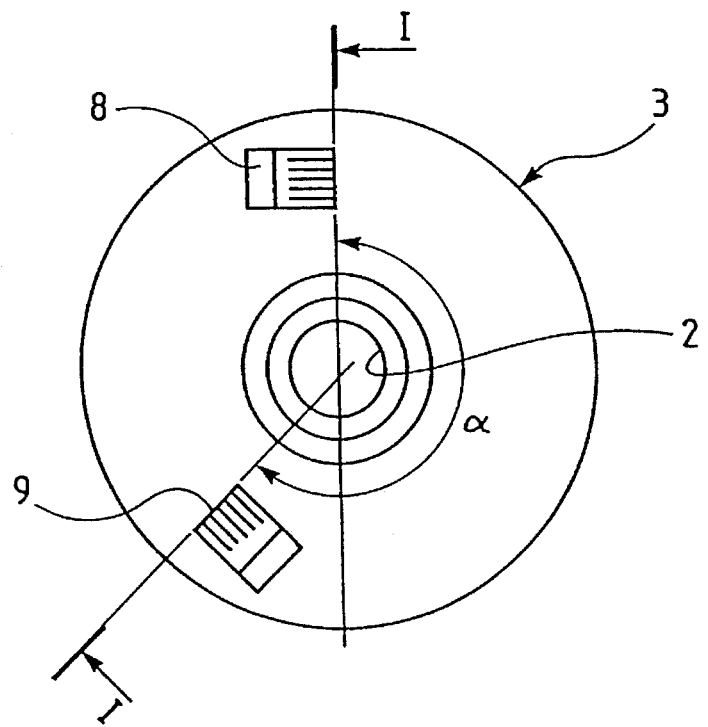
FIG. 5 is a view of the other external transverse face of the rotor.
Figure 6:
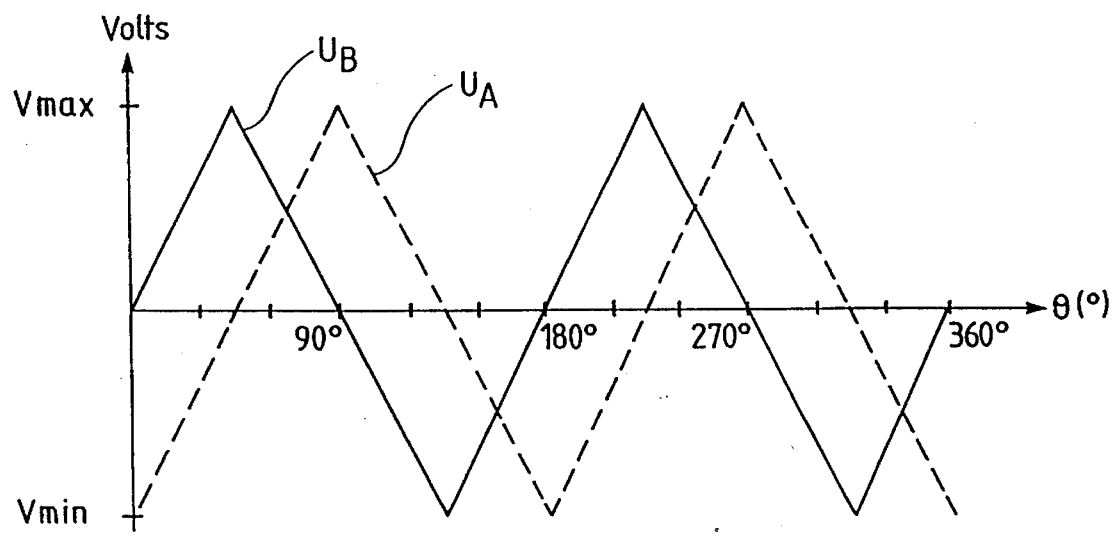
FIG. 6 is a graph showing the change over time in the signals $U_A$ and $U_B$ generated by the device of FIGS. 1 to 5.

If the angular position of the rotor with respect to the stator is designated by θ, taking as the original position that of FIG. 5, the changes in the voltages at the terminals A and B are given by FIG. 6, with variations between $V_{min}$ and $V_{max}$.

Figure 9:
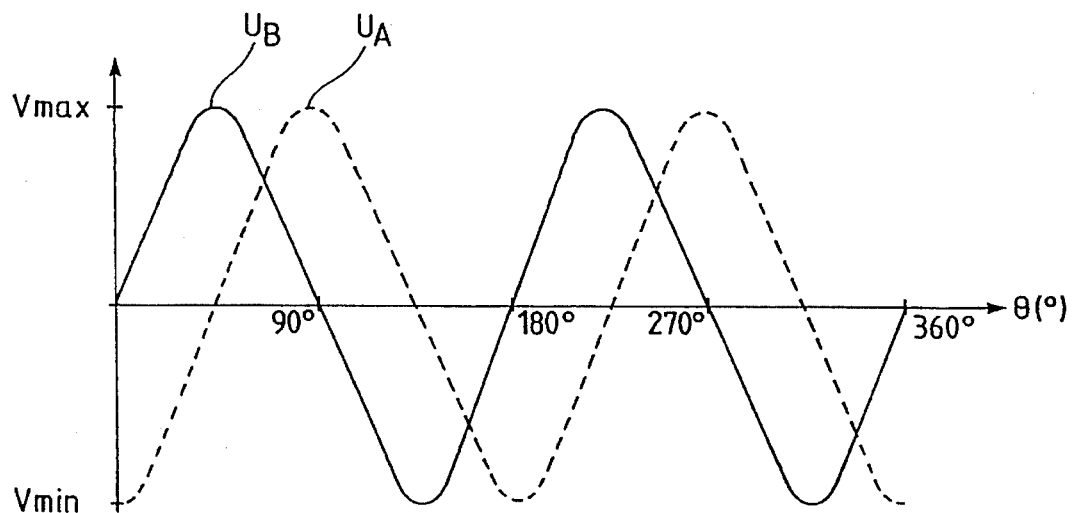
FIG. 9 is another similar graph showing the signals generated by the device of FIGS. 1 to 5 with electronic shaping processing.

As a variant, a signal-shaping processing component 100 adapted to convert alternating signals which vary linearly into alternating sinusoidal signals (for example a signal-generating integrated circuit of the AD 639 type made by ANALOG DEVICES) is inserted between the annular collector tracks 6 and 7 and the terminals A and B: the curves in FIG. 9 are then obtained. This enables the current to be controlled in a two-phase multipole motor (n pairs of poles) with a sinusoidal field, for example of the same type as the one described in European Patent 0,312,464. According to yet another embodiment (not shown), a signal peak clipper is inserted between the annular collector tracks 6 and 7 and the terminals A and B, in which case curves similar to those in FIG. 6 are obtained, except that, because of the peak clipping, these curves are trapezoidal. Other forms of signal-shape conversion may be chosen.

According to yet another embodiment, the resistivity of the signal track can be made to vary along its circumference, as a result of which non-linear variations of the potentials $U_A$ and $U_B$ as a function of the angle θ can be obtained without shaping processing between the annular collector tracks 6 and 7 and the terminals A and B.

It will be appreciated that the voltages $U_A$ and $U_B$ delivered at A and B can be used to supply the two phases of the motor 51, the output shaft of which drives the rotor 3.

Preferably, the annular signal track 5 is the only one; the input brushes, output brushes, collector tracks and output terminals are equal in number to the number of phases of the motor which it is desired to supply, and the number of first points (or second points) is equal to the number of pairs of poles in the motor (other numbers are possible subject to an appropriate electronic processing of the output signals).

Figure 2:
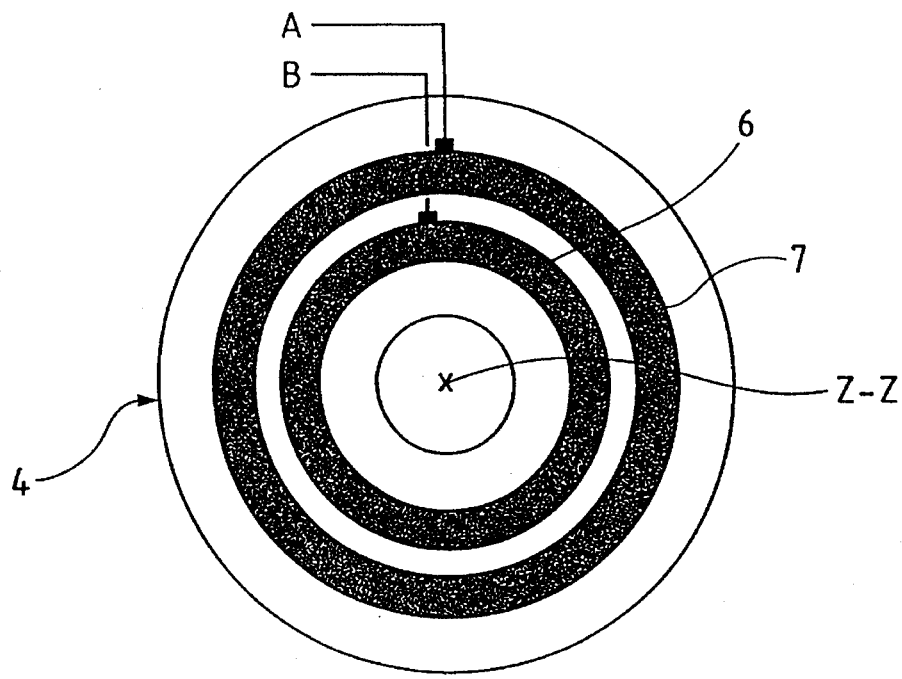
FIG. 2 is a view of one of the internal transverse faces of the stator.
Figure 3:
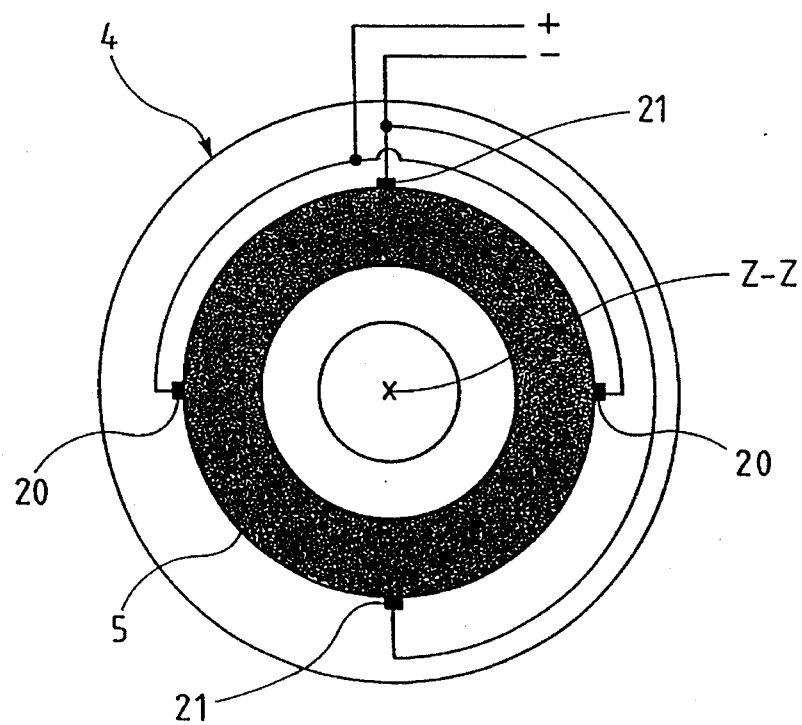
FIG. 3 is a view of the other one of the internal transverse faces of the stator.
Figure 4:
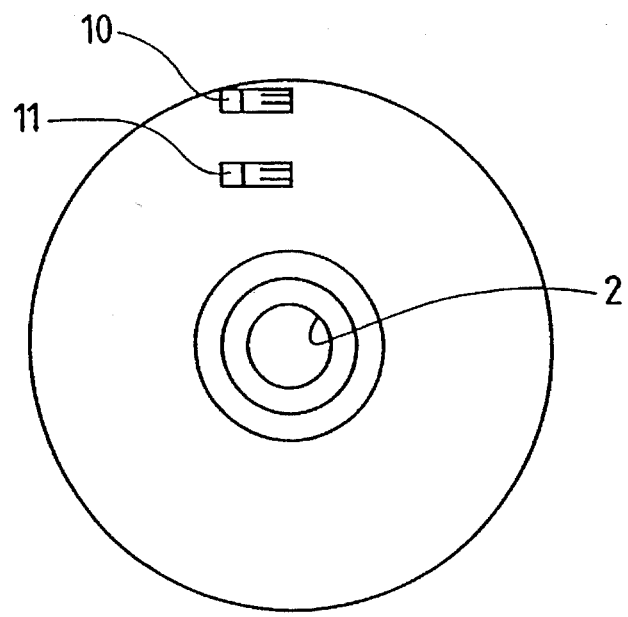
FIG. 4 is a view of the external transverse face of the rotor which is opposite to the face shown in FIG. 2.
Figure 7:
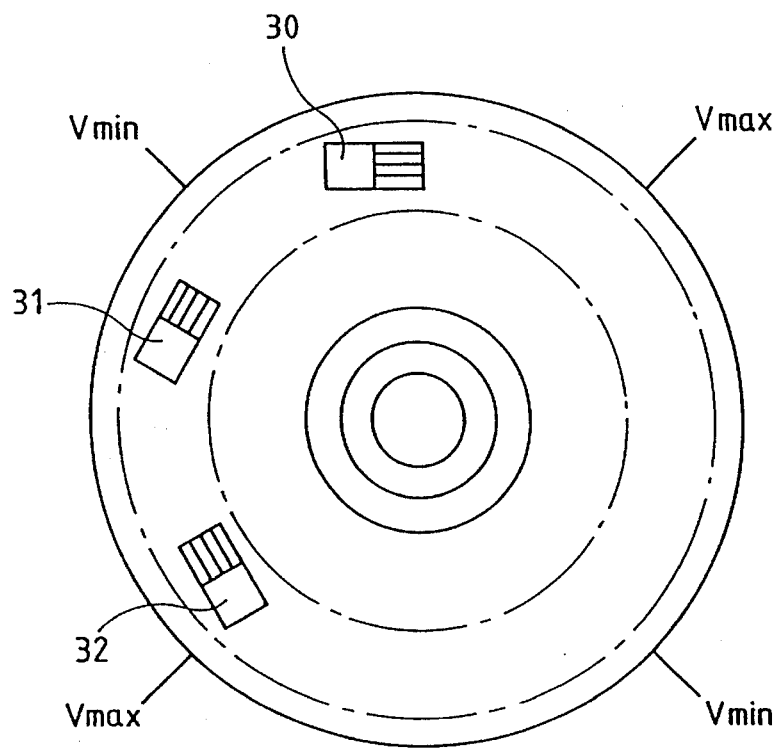
FIG. 7 is a view similar to FIG. 5, but with three collector bushes, according to an alternant embodiment of the invention.
Figure 7A:
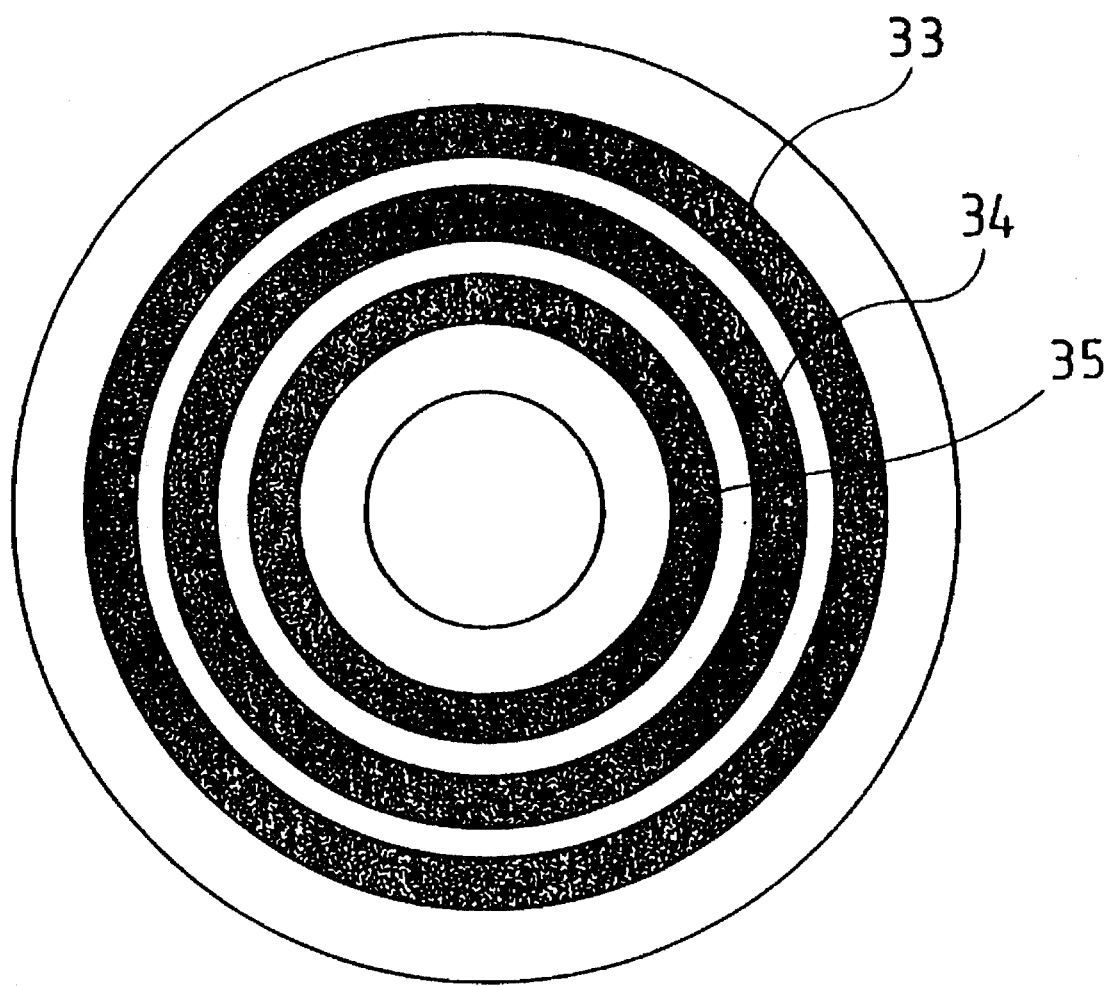
FIG. 7A is a view similar to FIG. 2, but with three collector tracks, according to an alternate embodiment of the present invention.
Figure 8:
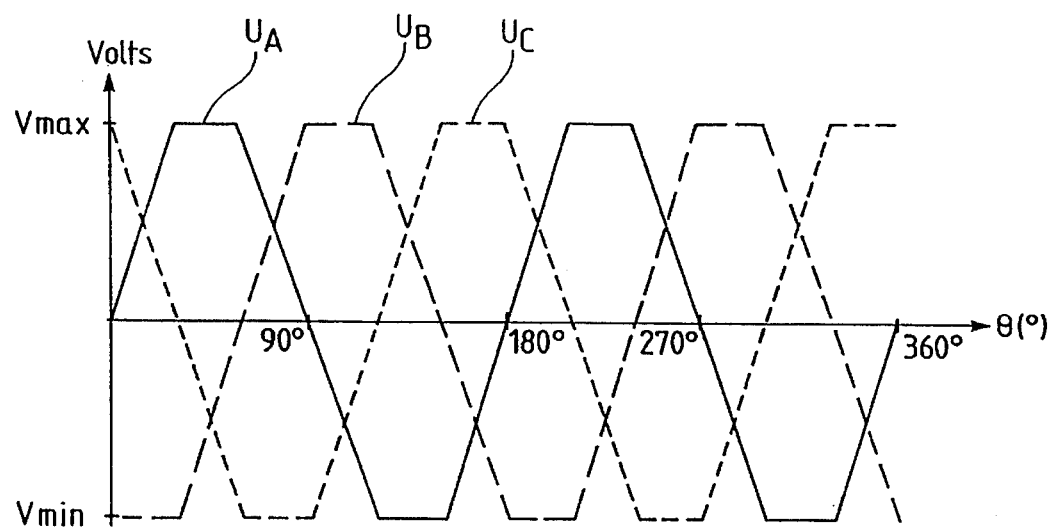
FIG. 8 is a graph similar to FIG. 6 showing the signals generated by the device of FIG. 7.

This is why, in order to drive a three-phase motor with two pairs of poles, it is preferable to provide three collector tracks 33, 34 and 35, see FIG. 7A, three output brushes and three input brushes 30, 31 and 32 placed in the arrangement shown in FIGS. 7 and 7A, with, for the associated signal track, two first points connected to $V_{max}$, two second points connected to $V_{min}$, disposed at 45°, 135°, 225° and 315° (positioned in FIG. 7 for purposes of clarity), the input brushes being disposed angularly at positions 0°, 60° and 120°, ie (i+⅓). π and (i+⅔). π, i being any integer, given that the angular period of the potential variation along the signal track equals π, as in FIG. 2. After clipping, the curves $U_A$, $U_B$ and $U_C$, shown in FIG. 8, are thus obtained, corresponding to the potentials taken off by the input brushes 30, 31 and 32, respectively, with an electrical phase difference of 120°.

Figure 10:
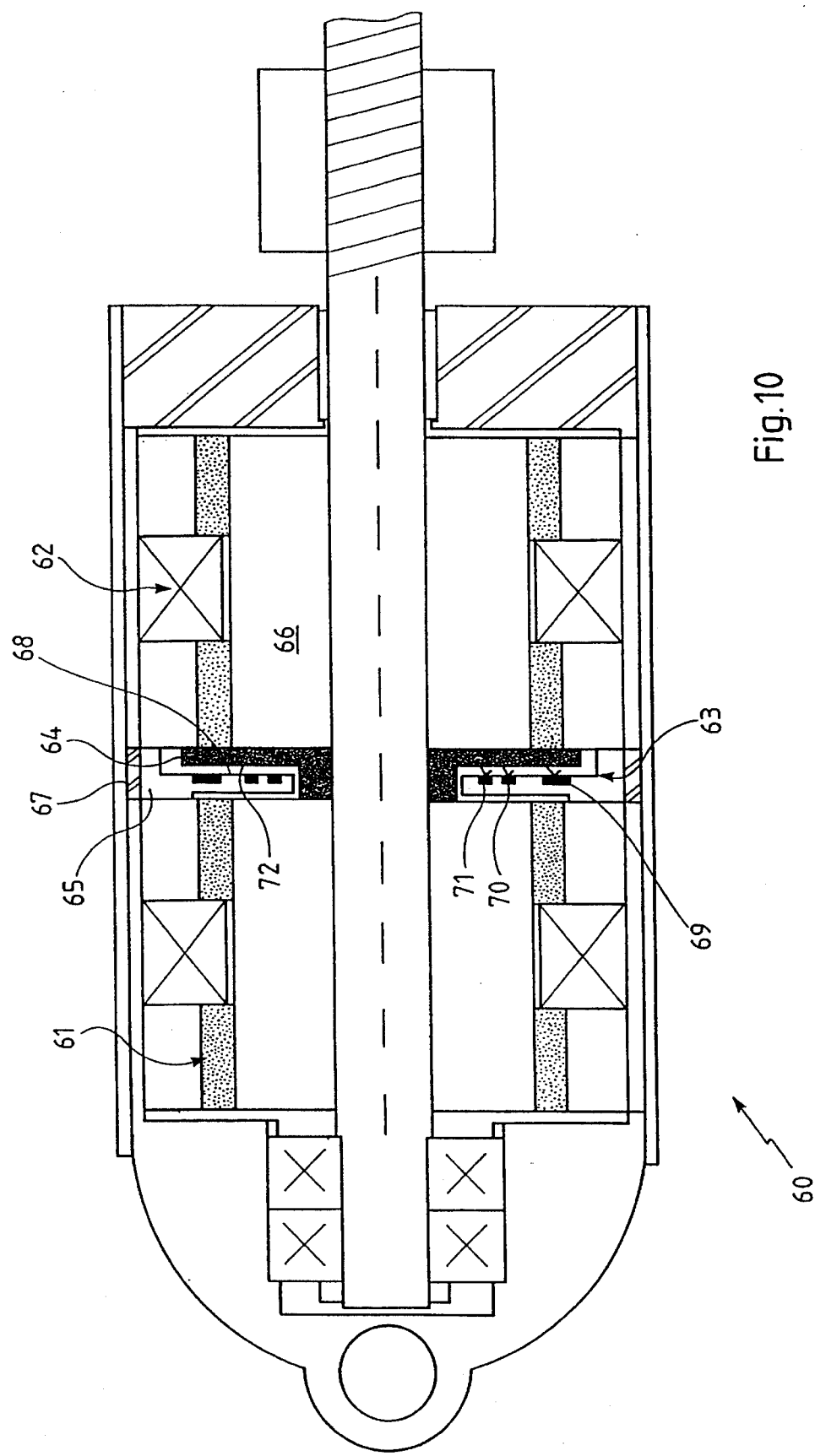
FIG. 10 is a view in cross section of yet another embodiment of the voltage modulation device, integrated into a two-phase motor.

FIG. 10 shows a further alternate embodiment of the invention and installation of a voltage modulation device in accordance with the invention.

In this FIG. 10 a two-phase motor 60 is shown in accordance with the above-mentioned European Patent 0,312,464 with two stages 61 and 62 of pole pieces+coils, corresponding to the two phases to be supplied. A voltage modulation device 63 is disposed between these two stages. To minimize the axial dimensions of the device, the rotor 64 and the stator 65 are rings with an L-shaped section fixed respectively to the rotor 66 and stator 67 of the motor, having only two facing faces, i.e. a single transverse stator face 68 on which are located both a signal track 69 and collector tracks 70 and 71 and a single transverse rotor face 72 carrying the various input and output brushes.

The processing of the signals $U_A$ and $U_B$ enables tachometric information to be obtained by derivation of the signals and demodulation. Thus, for example, with signals of the same type as those in FIG. 9, $V_{min}$ and $V_{max}$ are symmetrical with respect to a zero value, and may be written $-V_{ref}$ and $+V_{ref}$:

$$U_A = V_{ref} \sin 2\theta$$

$$U_B = V_{ref} \cos 2\theta$$

by derivation:

$$U'_A = 2 V_{ref} \theta \cos 2\theta$$

$$U'_B = 2 V_{ref} \theta \sin 2\theta$$

and:

$$V(\theta) = U'_A U_B - U'_B U_A = 2(V_{ref})^2 \theta$$

It goes without saying that the preceding description has been put forward only by way of non-limiting example and that many variants may be proposed by a person skilled in the art without departing from the scope of the invention. Thus, for example, the number of phases or pairs of first points and second points 20 and 21 may be different from two or three (for example one, four, etc.).

We claim:

1. A device for modulating a voltage supplied to a motor, said device comprising:

a fixed stator having a first statoric portion and a second statoric portion;

a DC voltage source having positive and negative terminals;

at least one annular resistive signal track located on said first statoric portion of said fixed stator and centered on a fixed central axis Z—Z, said at least one annular resistive signal track having an even plurality of angularly distributed connection points, said even plurality of angularly distributed connection points being alternately connected with said positive and said negative terminals of said DC voltage source, so that said at least one annular resistive signal track has an electrical potential having a periodic circumferential variation between a maximum value and a minimum value;

at least two collector tracks located on said second statoric portion of said fixed stator and concentrically centered on said fixed central axis Z—Z, at least two output terminals carried by said fixed stator, each output terminal of said at least two output terminals being electrically connected to a respective collector track of said at least two collector tracks;

a rotor coaxially disposed along said fixed central axis Z—Z, said rotor having a first rotoric portion and a second rotoric portion;

a rotary drive member mounted with said rotor for rotating said rotor about said fixed central axis Z—Z, at least two output brushes mounted on said first rotoric portion of said facing said second statoric portion, each said output brush of said at least two output brushes being contiguous to and in sweeping contact with a single collector track of said at least two collector tracks;

at least two input brushes mounted on said second rotoric portion of said rotor and facing said first statoric portion, each input brush of said at least two input brushes being electrically connected to an output brush of said at least two output brushes, said at least two input brushes being contiguous and in sweeping contact with separate zones of said at least one annular resistive signal track whereby said at least two output terminals are supplied with electric signals having a potential modulated in amplitude by the rotation of said rotor.

2. The device according to claim 1, wherein the number of said at least one annular resistive signal track is one and is swept by each of said at least two input brushes, further wherein each of said at least two input brushes are offset angularly.

3. The device according to claim 2, wherein the number of said at least two collector tracks is two and said at least two input brushes have an angular difference of $(i+¼)$. $\phi$, where $i$ is an integer and $\phi$ is an angular period of an electrical potential in said two collector tracks.

4. The device according to claim 2, wherein said at least two collector tracks are three and said at least two input brushes have a first and second angular difference of $(i+⅓)$. $\phi$, and $(i+⅔)$ $\phi$, where $i$ is an integer and $\phi$ is an angular period of a potential in each of said three collector tracks.

5. The device according to claim 4, wherein said single annular resistive signal track is connected at four points positioned 90° to each other, in alternation, either to said positive terminal or to said negative terminal of said DC voltage source, and wherein said potential has an angular period of $\pi$.

6. The device according to claim 1, wherein said fixed stator comprises a first set of faces each located at a right angle to said central axis Z—Z, said rotor comprises a second set of faces each located at a right angle to said central axis Z—Z, said at least one annular signal track and said at least two collector tracks and said at least two input and said at least two output brushes are located on said first and second set of faces.

7. The device according to claim 6, wherein said at least two input brushes are located on a first face of said second set of faces and said at least two output brushes are located on a second face of said second set of faces of said rotor, and said at least one annular signal track and said at least two collector tracks are located on different faces of said first set of faces of said fixed stator.

8. The device according to claim 6, wherein each of said input brushes and said output brushes are located on one face of said second set of faces of said rotor, and each of said signal and collector tracks are located on one face of said first set of faces of said fixed stator.

9. The device according to claim 1, wherein said at least one annular resistive signal track and said at least two collector tracks are located on a cylindrical surface of said fixed stator and said at least two input and said at least two output brushes are located on a cylindrical surface of said rotor.

10. The device according to claim 1, wherein a signal-shaping component is connected between said at least two collector tracks and said at least two output terminals.

11. The device according to claim 1, wherein said rotary drive member is an output shaft of a brushless electric motor and wherein said brushless electric motor has a plurality of phase differences functionally controlled by said electric signal supplied to said at least two output terminals.

12. The device according to claim 11, wherein said rotor further comprises a hollow sleeve coupled, with respect to rotation, to said output shaft of said brushless electric motor.

13. The device according to claim 1, wherein said at least one annular resistive signal track has a resistivity and wherein said at least two collector tracks each having a resistivity lower than said resistivity of said at least one annular resistive signal track by at least two orders of magnitude.

14. The device of claim 1 further comprising a switching terminal connected to each said output terminal of said at least two output terminals, said switching terminal for triggering a power supply to phase conductors of said motor.

15. The device of claim 14 wherein said motor comprises a shaft and wherein said rotary drive member comprises said shaft of said motor connected to said rotor for rotating said rotor.

* * * * *

UNITED STATES PATENT AND TRADEMARK OFFICE
CERTIFICATE OF CORRECTION

PATENT NO. : 5,479,057

DATED : December 26, 1995

INVENTOR(S) : Richard Rossi and Jean-Yves Guerrero

It is certified that error appears in the above-indentified patent and that said Letters Patent is hereby corrected as shown below:

Column 2, line 41, delete "$\phi$" insert ---- $\varphi$ ----.

Column 2, line 42, delete "$\phi$" insert ---- $\varphi$ ----.

Column 2, line 46, delete "$\phi$" insert ---- $\varphi$ ----.

Column 2, line 47, delete "$\phi$" first and second occurrence, insert ---- $\varphi$ ----.

Column 3, line 41, delete "bushes" insert ---- brushes ----.

Column 5, line 6, after "shown" insert ---- $\alpha$ ----.

Column 5, line 40, delete "$V_{max}$," insert ---- $V_{max}$. ----.

Column 6, line 10, delete "tracks 33,34" insert ---- tracks, 33, 34 ----.

Column 7, line 53, delete "$\phi$" insert ---- $\varphi$ ----.

Column 7, line 54, delete "$\phi$" insert ---- $\varphi$ ----.

UNITED STATES PATENT AND TRADEMARK OFFICE
CERTIFICATE OF CORRECTION

PATENT NO.   : 5,479,057
DATED        : December 26, 1995
INVENTOR(S)  : Richard Rossi and Jean-Yves Guerrero It is certified that error appears in the above-indentified patent and that said Letters Patent is hereby corrected as shown below:

Column 7, line 59, delete "φ" every occurrence, insert ---- φ ----.

Column 8, line 20, after "annular" insert ---- resistive ----.

Signed and Sealed this

Nineteenth Day of March, 1996

BRUCE LEHMAN

*Attest:*

*Attesting Officer*        *Commissioner of Patents and Trademarks*